US012764622B2

(12) United States Patent
Lin et al.

(10) Patent No.: US 12,764,622 B2
(45) Date of Patent: Oct. 13, 2026

(54) USER TERMINAL AND METHOD FOR SWITCHING ROUTING IN LOW-EARTH ORBIT SATELLITE NETWORK

(71) Applicant: Industrial Technology Research Institute, Hsinchu (TW)

(72) Inventors: An-Dee Lin, Taichung City (TW); Hua-Lung Tsai, Taipei City (TW); Ching-Chun Chou, Taipei City (TW)

(73) Assignee: Industrial Technology Research Institute, Hsinchu (TW)

( * ) Notice: Subject to any disclaimer, the term of this patent is extended or adjusted under 35 U.S.C. 154(b) by 473 days.

(21) Appl. No.: 18/172,314

(22) Filed: Feb. 22, 2023

(65) Prior Publication Data

US 2024/0129821 A1 Apr. 18, 2024

(30) Foreign Application Priority Data

Oct. 14, 2022 (TW) ................................ 111139041

(51) Int. Cl.

*H04W 36/08* (2009.01)
*H04W 40/20* (2009.01)
*H04W 84/06* (2009.01)

(52) U.S. Cl.

CPC .......... *H04W 36/08* (2013.01); *H04W 40/20* (2013.01); *H04W 84/06* (2013.01)

(58) Field of Classification Search

None
See application file for complete search history.

(56) References Cited

U.S. PATENT DOCUMENTS

| | | | | |
|---|---|---|---|---|
| 5,600,629 A * | 2/1997 | Van Daele | H04B 7/1856 370/316 |
| 10,998,965 B2 | 5/2021 | Tong et al. | |
| 11,032,751 B2 | 6/2021 | Arur et al. | |
| 11,083,026 B2 | 8/2021 | Lauridsen et al. | |
| 12,356,262 B2 * | 7/2025 | Li | H04W 36/362 |
| 2008/0170536 A1 * | 7/2008 | Marshack | H04B 7/1858 370/316 |

(Continued)

FOREIGN PATENT DOCUMENTS

| | | |
|---|---|---|
| CN | 106230719 | 6/2019 |
| CN | 106549703 | 9/2019 |

(Continued)

OTHER PUBLICATIONS

"Search Report of Europe Counterpart Application", issued on Aug. 17, 2023, p. 1-p. 9.

(Continued)

*Primary Examiner* — Gregory B Sefcheck
(74) *Attorney, Agent, or Firm* — JCIPRNET

(57) ABSTRACT

A method for switching routing in a low-earth-orbit satellite network, being adapted to a user terminal (UT), includes the following. Routing information is generated by the UT. The routing information is installed into a first routing table of a first satellite. The routing information is installed into a second routing table of a second satellite by the UT. The routing information of the first routing table is updated to relay information by the UT. The relay information corresponds to the second satellite. Handover from the first satellite to the second satellite is performed by the UT.

10 Claims, 5 Drawing Sheets

(56) References Cited

U.S. PATENT DOCUMENTS

| | | | | |
|---|---|---|---|---|
| 2011/0164516 | A1* | 7/2011 | Kalkunte | H04W 88/021 370/252 |
| 2015/0271730 | A1* | 9/2015 | Benammar | H04B 7/18517 455/436 |
| 2016/0323032 | A1* | 11/2016 | Ulupinar | H04B 7/2041 |
| 2017/0041830 | A1 | 2/2017 | Davis et al. | |
| 2017/0070939 | A1* | 3/2017 | Chong | H04W 36/36 |
| 2017/0105153 | A1* | 4/2017 | Ashrafi | H04B 7/195 |
| 2017/0215121 | A1* | 7/2017 | Condeixa | H04W 4/40 |
| 2017/0230104 | A1* | 8/2017 | Purkayastha | H04W 48/20 |
| 2018/0138968 | A1* | 5/2018 | Auer | H04B 7/18515 |
| 2018/0359670 | A1* | 12/2018 | Fang | H04W 36/085 |
| 2018/0376393 | A1* | 12/2018 | Wu | H04B 7/18521 |
| 2020/0052782 | A1* | 2/2020 | Wang | H04B 7/18541 |
| 2020/0153500 | A1* | 5/2020 | Kim | H04B 17/318 |
| 2020/0204250 | A1* | 6/2020 | Ravishankar | H04B 7/18541 |
| 2020/0259739 | A1* | 8/2020 | Kantawala | H04W 40/26 |
| 2020/0343968 | A1 | 10/2020 | Liu et al. | |
| 2021/0306069 | A1 | 9/2021 | Yan et al. | |
| 2022/0069902 | A1* | 3/2022 | Fan | H04W 36/38 |
| 2022/0070752 | A1* | 3/2022 | Kim | H04W 24/08 |
| 2022/0217589 | A1* | 7/2022 | Wang | H04B 7/18513 |
| 2022/0225201 | A1* | 7/2022 | Rezaee | H04W 36/30 |
| 2022/0263567 | A1* | 8/2022 | Sullivan | H04W 40/12 |
| 2022/0272022 | A1* | 8/2022 | Akhavain Mohammadi | H04L 45/02 |
| 2023/0045249 | A1* | 2/2023 | Hou | H04W 36/0055 |
| 2023/0059780 | A1* | 2/2023 | Ravishankar | H04B 7/18586 |
| 2023/0075345 | A1* | 3/2023 | Ravishankar | H04B 7/18521 |
| 2023/0092301 | A1* | 3/2023 | Burr | H04B 10/1129 398/115 |
| 2023/0156826 | A1* | 5/2023 | Palermo | H04B 7/18517 370/329 |
| 2023/0262687 | A1* | 8/2023 | Sayed Hassan | H04W 36/0072 370/331 |
| 2024/0146407 | A1* | 5/2024 | Suh | H04W 84/06 |
| 2024/0204866 | A1* | 6/2024 | Ciochina | H04B 7/1851 |
| 2024/0250899 | A1* | 7/2024 | Ravishankar | H04B 7/195 |
| 2024/0251322 | A1* | 7/2024 | Han | H04W 36/30 |
| 2024/0284288 | A1* | 8/2024 | Shi | H04W 36/0022 |
| 2025/0056354 | A1* | 2/2025 | Lauridsen | H04B 7/18541 |

FOREIGN PATENT DOCUMENTS

| | | |
|---|---|---|
| CN | 113258987 | 8/2021 |
| CN | 113260005 | 8/2021 |
| CN | 112054823 | 4/2022 |
| CN | 113133062 | 5/2022 |
| EP | 3332489 | 9/2019 |
| JP | 5600215 | 10/2014 |
| TW | 202046665 | 12/2020 |

OTHER PUBLICATIONS

Enric Juan et al., "5G New Radio Mobility Performance in LEO-based Non-Terrestrial Networks", 2020 IEEE Globecom Workshops (GC Wkshps), Dec. 7-11, 2020, pp. 1-6.

Joan A. Ruiz De Azúa et al., "Internet of Satellites (IoSat): Analysis of Network Models and Routing Protocol Requirements", IEEE Access, vol. 6, Apr. 6, 2018, pp. 20390-20411.

Jian Li et al., "Temporal Netgrid Model-Based Dynamic Routing in Large-Scale Small Satellite Networks", IEEE Transactions on Vehicular Technology , vol. 68, No. 6, Jun. 2019, pp. 6009-6021.

Jian Li et al., "A User-Centric Handover Scheme for Ultra-Dense LEO Satellite Networks", IEEE Wireless Communications Letters, vol. 9, No. 11, Nov. 2020, pp. 1904-1908.

Senbai Zhang et al., "A Network-Flows-Based Satellite Handover Strategy for LEO Satellite Networks", IEEE Wireless Communications Letters, vol. 10, No. 12, Dec. 2021, pp. 2669-2673.

Cui-Qin Dai et al., "Dynamic Handover in Satellite-Terrestrial Integrated Networks", 2019 IEEE Globecom Workshops (GC Wkshps), Dec. 9-13, 2019, pp. 1-6.

"Office Action of Taiwan Counterpart Application", issued on Sep. 21, 2023, p. 1-p. 7.

* cited by examiner 301 302 303

| Matching | Remaining time | Operation |
|---|---|---|
| UT1 | $t_{UT1}$ | Transmission to position of UT1 |

300

FIG. 3

401 402 403

| Matching | Remaining time | Operation |
|---|---|---|
| UT1 | $T_{timeout}$ | Transmission from inter-satellite link to LEO2 |

400

FIG. 4

USER TERMINAL AND METHOD FOR SWITCHING ROUTING IN LOW-EARTH ORBIT SATELLITE NETWORK

CROSS-REFERENCE TO RELATED APPLICATION

This application claims the priority benefit of Taiwanese application no. 111139041, filed on Oct. 14, 2022. The entirety of the above-mentioned patent application is hereby incorporated by reference herein and made a part of this specification.

TECHNICAL FIELD

The disclosure relates to a method for switching routing in a low-earth-orbit satellite network and a user terminal.

BACKGROUND

With the development of communication technology, a satellite network plays an increasingly important role in the next generation mobile communication network. A satellite network architecture includes a data plane, a control plane, and a management plane. The data plane includes a low-earth-orbit (LEO) satellite node and a user terminal (UT) accessing the LEO satellite node. The control plane includes a geostationary-earth-orbit (GEO) satellite node and is capable of covering the Earth, realizing centralized management and control over the data plane. The control plane sends status information of the satellite network to the management plane to obtain structural information of a satellite global network.

In the next generation mobile communication network, control plane and data plane separation, software-defined network (SDN), and network function virtualization (NFV) have become a paradigm for the communication network architecture and is expected to be transferred to the LEO satellite network in the future. In an SDN-based multi-layer satellite network architecture, a contact time of a LEO satellite with the user terminal is a few minutes. Due to such a short contact time, the user terminal may frequently perform handover between several LEO satellites, for a number of times that is more than the number of ground-based mobile networks. Accordingly, the control plane, or referred to as a network management center, needs to frequently send control signaling to maintain, for example, routing and quality of service parameters, for the data plane of the user terminal.

Moreover, delay in communication of the LEO satellite to the control plane is greater than delay in direct connection of a ground base station in the mobile network to a core network through optical fiber. In particular, the LEO satellite generally needs multiple times of inter-satellite link (ISL) transmission before reaching the control plane. As a result, the user terminal spend additional time waiting for the exchange of handover control signaling before actually performing handover to the next LEO satellite. Consumption of such additional time affects service continuity of the user terminal and diminish the user experience.

SUMMARY

The disclosure provides a method for switching routing in a low-earth-orbit satellite network and a user terminal.

An embodiment of the disclosure provides a method for switching routing in a low-earth-orbit satellite network, adapted to a user terminal (UT). The method includes the following. Routing information is generated by the user terminal. The routing information is installed into a first routing table of a first satellite. The routing information is installed into a second routing table of a second satellite by the user terminal. The routing information of the first routing table is updated to relay information by the user terminal. The relay information corresponds to the second satellite. Handover from the first satellite to the second satellite is performed by the user terminal.

An embodiment of the disclosure provides a user terminal including a transceiver, a storage medium, and a processor coupled to the transceiver and the storage medium. The processor is configured to: generate routing information installed into a first routing table of a first satellite; install the routing information into a second routing table of a second satellite; update the routing information of the first routing table to relay information corresponding to the second satellite; and perform handover from the first satellite to the second satellite.

BRIEF DESCRIPTION OF THE DRAWINGS

FIG. 3 is a schematic diagram of routing information according to an embodiment of the disclosure.

FIG. 4 is a schematic diagram of relay information according to an embodiment of the disclosure.

DESCRIPTION OF THE EMBODIMENTS

Figure 1:
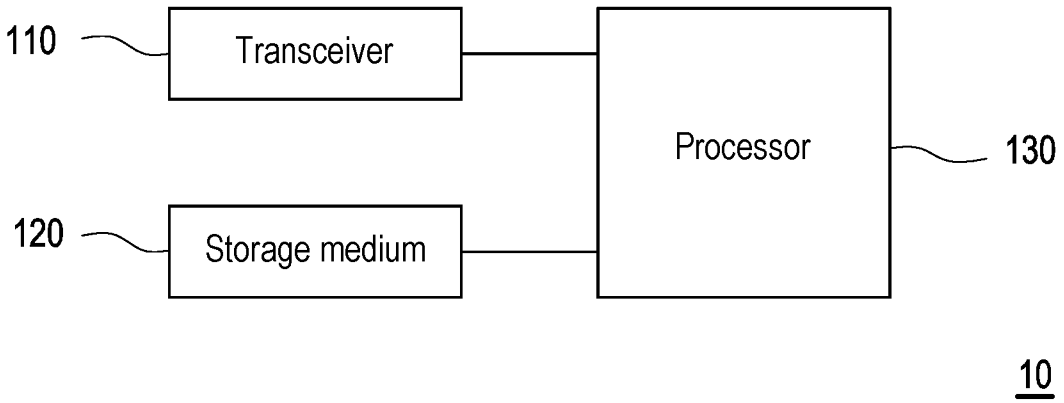
FIG. 1 is a block diagram of a user terminal according to an embodiment of the disclosure.

Some embodiments of the disclosure accompanied with the drawings will be described in detail below. The same reference numerals in the description below and in the drawings refer to the same or similar elements. These embodiments are only a part of the disclosure and do not disclose all possible implementations of the disclosure. More specifically, these embodiments are only examples of the scope of the appended claims of the disclosure. Wherever possible, elements/members/steps using the same reference numerals in the drawings and embodiments refer to the same or similar parts. Cross-reference may be mutually made to the relevant descriptions of elements/members/steps using the same reference numerals or using the same terms in different embodiments.

FIG. 1 is a block diagram of a user terminal according to an embodiment of the disclosure. A user terminal 10 includes a transceiver 110, a storage medium 120, and a processor 130. The processor 130 is coupled to the transceiver 110 and the storage medium 120. The user terminal 10 may wirelessly communicate with a satellite flying in space. In an embodiment, the user terminal 10 may be user equipment (UE), for example. The term "user equipment" of embodiments of the disclosure may refer to various embodiments, which may include, for example, a mobile station, an advanced mobile station, a server, a client end, a desktop computer, a notebook computer, a network computer, a workstation, a personal digital assistant, a personal computer, a tablet computer, a scanner, a telephone device, a calling device, a camera, a television, a handheld game console, a music device, a wireless sensor, or the like. In some applications, the user terminal 10 may be a stationary computer device operating in a mobile environment such as a bus, a train, an airplane, a ship, an automobile, or the like. In some embodiments, the user terminal 10 may be a base station in a communication system. The term "base station" (BS) of embodiments of the disclosure may be, for example, synonymous with a variation or a sub-variation of "gNodeB" (gNB), "eNodeB" (eNB), a node B, an advanced BS (ABS), a transmission reception point (TRP), an unlicensed TRP, a base transceiver system (BTS), an access point, a home BS, a relay station, a scatterer, a repeater, an intermediate node, an intermediary, a satellite-based communication BS, and so on.

The transceiver 110 wirelessly transmits downlink signals and receives uplink signals. The transceiver 110 may be configured to transmit and receive signals at radio frequencies or at millimeter wave frequencies. The transceiver 110 may also perform operations such as low noise amplification, impedance matching, frequency mixing, frequency up-conversion or down-conversion, filtering, amplification, and the like. The transceiver 110 may include one or more analog-to-digital (A/D) converters and digital-to-analog (D/A) converters that are configured for conversion from an analog signal format to a digital signal format during uplink signal processing, and conversion from a digital signal format to an analog signal format during downlink signal processing. The transceiver 110 may further include an antenna array that may include one or more antennas for transmitting and receiving omnidirectional antenna beams or directional antenna beams.

The storage medium 120 may store a computer program. In an embodiment, the storage medium 120 is any type of fixed or removable random access memory (RAM), read-only memory (ROM), flash memory, a hard disk drive (HDD), a solid state drive (SSD), or similar elements or a combination thereof. The storage medium 120 is configured to store a plurality of modules, computer programs, or various applications executable by the processor 130.

The processor 130 is in charge of the whole or part of the operation of the user terminal 10. In an embodiment, the processor 130 is a central processing unit (CPU), or any other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar elements or a combination thereof.

Figure 2:
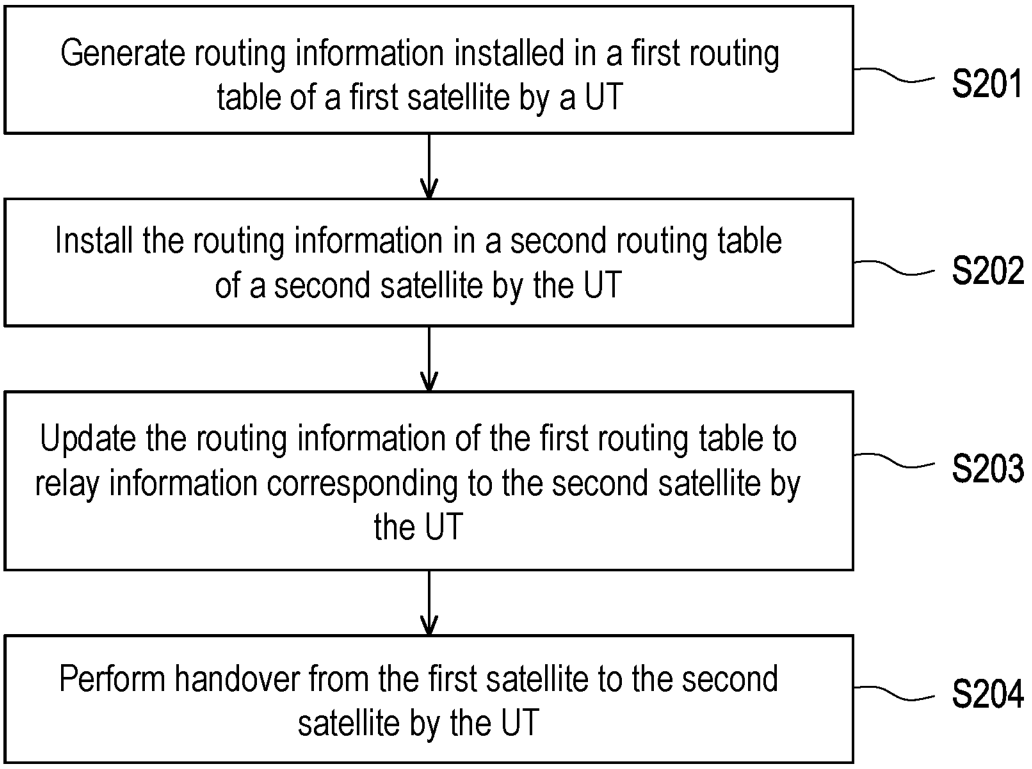
FIG. 2 is a flowchart of a method for switching routing in a low-earth-orbit satellite network according to an embodiment of the disclosure.

FIG. 2 is a flowchart of a method for switching routing in a low-earth-orbit satellite network according to an embodiment of the disclosure. The method shown in FIG. 2 is applicable to the user terminal 10. In step S201, routing information is generated by the user terminal 10. The routing information is installed into a first routing table of a first satellite. In step S202, the routing information is installed into a second routing table of a second satellite by the user terminal 10. In step S203, the routing information of the first routing table is updated to relay information by the user terminal 10. The relay information corresponds to the second satellite. In step S204, handover from the first satellite to the second satellite is performed by the user terminal 10.

FIG. 3 is a schematic diagram of routing information according to an embodiment of the disclosure. In an embodiment, the data format of routing information 300 may include fields of matching 301, remaining time 302, and operation 303. Specifically, the user terminal 10 may install the routing information 300 into a routing table of a satellite. Upon receipt of a packet, the satellite determines the routing operation of the packet according to the content of the routing information 300.

In an embodiment, the content of the field of matching 301 of the routing information 300 is "UT1", which indicates the routing rule of the packet matching the user terminal "UT1". In an embodiment, the field of matching 301 may include an identification of the user terminal 10. The identification may be a device identification code of the user terminal 10 or an identification code of the user terminal 10 logging into a satellite network.

In an embodiment, the content of the field of remaining time 302 of the routing information 300 is "$t_{UT1}$" and this setting value represents a contact time of the user terminal "UT1" with the satellite. In the routing table of the satellite, the contact time $t_{UT1}$ as set in the field of remaining time 302 of the routing information 300 is counted down until the contact time $t_{UT1}$ is reset to zero. The satellite maintains the routing rule of the routing information 300 until the contact time $t_{UT1}$ is reset to zero. In an embodiment, the contact time $t_{UT1}$ may be determined according to a flight trajectory model of the satellite and a position of the user terminal "UT1".

In an embodiment, the content of the field of operation 303 of the routing information 300 is "transmission to position of UT1", which indicates that the satellite is to transmit the data of the packet to the position of the user terminal "UT1". In an embodiment, the position may be a Global Positioning System (GPS) position of the user terminal "UT1". In an embodiment, the field of operation 303 may also be set to a beam pointing to the GPS position of the user terminal "UT1".

FIG. 4 is a schematic diagram of relay information according to an embodiment of the disclosure. In an embodiment, the data format of relay information 400 may include fields of matching 401, remaining time 402, and operation 403. Specifically, the user terminal 10 may update the routing information 300 stored in the routing table of the satellite to the relay information 400. Upon receipt of a packet, the satellite determines the routing operation of the packet according to the content of the relay information 400.

In an embodiment, the content of the field of matching 401 of the relay information 400 is "UT1", which indicates the routing rule of the packet matching the user terminal "UT1". In an embodiment, the field of matching 401 may include the identification of the user terminal 10. The identification may be a device identification code of the user terminal 10 or an identification code of the user terminal 10 logging into a satellite network.

In an embodiment, the content of the field of remaining time 402 of the relay information 400 is "$T_{timeout}$", and this setting value represents a waiting time of retaining the relay information 400 in the routing table of the satellite during handover performed by the user terminal "UT1" between the satellites. In the routing table of the satellite, the waiting time $T_{timeout}$ as set in the field of remaining time 402 of the relay information 400 is counted down until the waiting time $T_{timeout}$ is reset to zero. In an embodiment, routing corresponding to the relay information 400 is triggered during the waiting time $T_{timeout}$, and the waiting time $T_{timeout}$ is re-counted. In an embodiment, routing corresponding to the relay information 400 is not triggered during the waiting time $T_{timeout}$, and the relay information 400 is removed from the routing table.

In an embodiment, the content of the field of operation 403 of the relay information 400 is "transmission from inter-satellite link to LEO2", which indicates that the satellite is to transmit the data of the packet from the inter-satellite link to a satellite "LEO2". Accordingly, before handover is completed by the user terminal 10, the data of the packet may be relayed from the current satellite to the next satellite, which prevents the user terminal 10 from losing the packet during handover.

Figure 5:
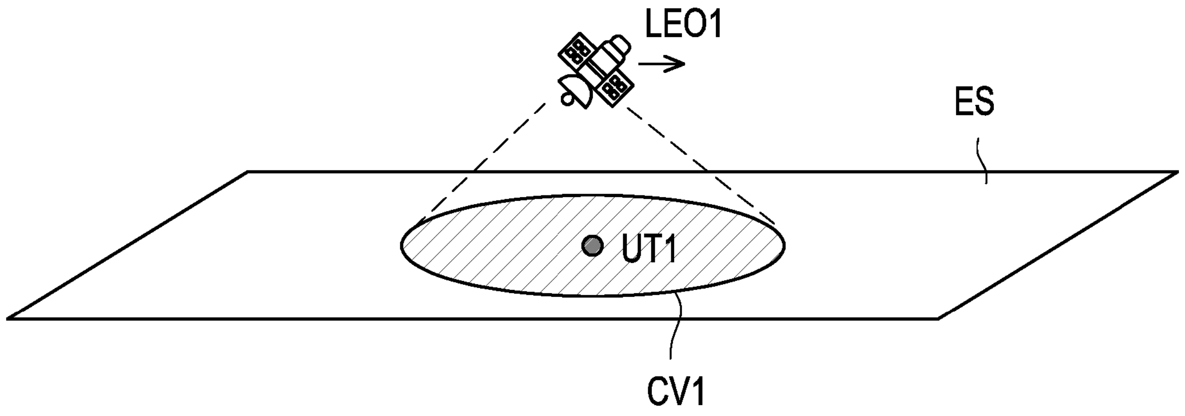
FIG. 5 is a schematic diagram of a user terminal and a first satellite according to an embodiment of the disclosure.

FIG. 5 is a schematic diagram of a user terminal and a first satellite according to an embodiment of the disclosure. The user terminal UT1 is located on the Earth's surface ES. A satellite LEO1 has a signal coverage CV1 on the Earth's surface ES. The user terminal UT1 is within the signal coverage CV1 of the satellite LEO1. In an embodiment, after the user terminal UT1 is powered on and detects the satellite LEO1, the user terminal UT1 evaluates the contact time $t_{UT1}$ of the satellite LEO1 with the next satellite following the satellite LEO1. In an embodiment, the user terminal UT1 determines the contact time $t_{UT1}$ according to a flight trajectory model of the satellite LEO1 and the position of the user terminal UT1. In an embodiment, the user terminal UT1 determines the next satellite following the satellite LEO1 according to the two-line element (TLE) associated with the satellite LEO1. In an embodiment, the user terminal UT1 generates routing information as in Table 1 below, and installs the routing information into a routing table of the satellite LEO1.

TABLE 1

| Matching | Remaining time | Operation |
|---|---|---|
| UT1 | $t_{UT1}$ | Transmission to position of UT1 |

Figure 6:
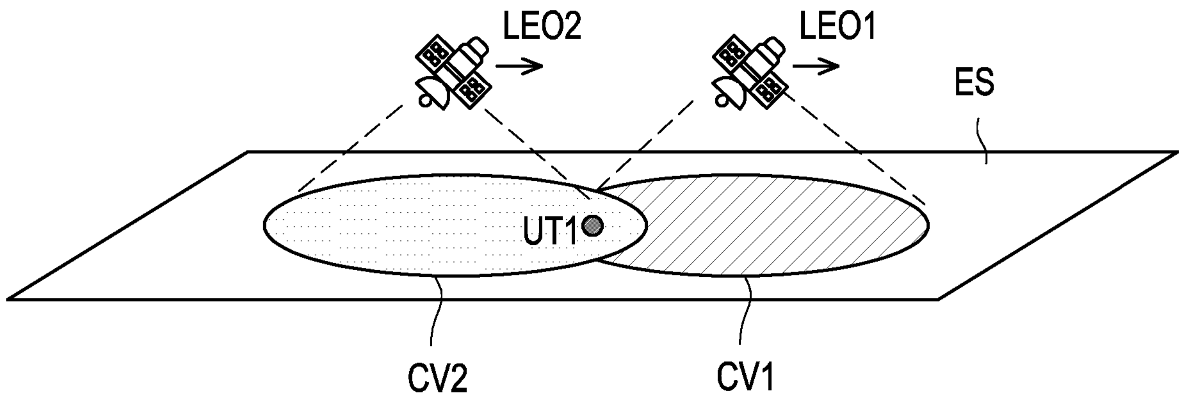
FIG. 6 is a schematic diagram of a user terminal, a first satellite, and a second satellite during handover preparation according to an embodiment of the disclosure.

FIG. 6 is a schematic diagram of a user terminal, a first satellite, and a second satellite during handover preparation according to an embodiment of the disclosure. The user terminal UT1 is located on the Earth's surface ES. The satellite LEO1 has the signal coverage CV1 on the Earth's surface ES. A satellite LEO2 has a signal coverage CV2 on the Earth's surface ES. The user terminal UT1 is within the signal coverage CV1 of the satellite LEO1, and the user terminal UT1 is within the signal coverage CV2 of the satellite LEO2. In an embodiment, when the contact time $t_{UT1}$ is reset to zero, the user terminal UT1 prepares for handover to the satellite LEO2. At this time, the user terminal UT1 determines a new contact time $t'_{UT1}$ according to the satellite LEO2. In an embodiment, the user terminal UT1 evaluates the new contact time $t'_{UT1}$ of the satellite LEO2 and the next satellite following the satellite LEO2. In an embodiment, the user terminal UT1 determines the new contact time $t'_{UT1}$ according to a flight trajectory model of the satellite LEO2 and the position of the user terminal UT1. In an embodiment, the user terminal UT1 determines the next satellite following the satellite LEO2 according to the two-line element (TLE) associated with the satellite LEO2. In an embodiment, the user terminal UT1 updates routing information as in Table 2 below, and installs the updated routing information into a routing table of the satellite LEO2.

TABLE 2

| Matching | Remaining time | Operation |
|---|---|---|
| UT1 | $t'_{UT1}$ | Transmission to position of UT1 |

It should be noted that during preparation for handover from the satellite LEO1 to the satellite LEO2 by the user terminal UT1, the packet data of the user terminal UT1 may still be transmitted to the data network through the satellite LEO1. Specifically, before handover from the satellite LEO1 to the satellite LEO2 is completed by the user terminal UT1, some on-the-fly packet data that have been sent by the user terminal UT1 are still transmitted to the satellite LEO1. At this time, it is necessary to modify the routing table of the satellite LEO1 to relay the packet data to the satellite LEO2. In an embodiment, the user terminal UT1 generates relay information as in Table 3 below, and updates the routing information of the routing table of the satellite LEO1 to the relay information that corresponds to the satellite LEO2.

TABLE 3

| Matching | Remaining Time | Action |
|---|---|---|
| UT1 | $T_{timeout}$ | Transmission from inter-satellite link to LEO2 |

In an embodiment, the waiting time $T_{timeout}$ is re-counted in response to routing corresponding to the relay information being triggered during the waiting time $T_{timeout}$. In an embodiment, the relay information is removed from the routing table of the satellite LEO1 in response to routing corresponding to the relay information not being triggered during the waiting time $T_{timeout}$.

In an embodiment, after the routing of the satellite LEO1 and the satellite LEO2 is set up, the user terminal UT1 performs handover from the satellite LEO1 to the satellite LEO2.

Figure 7:
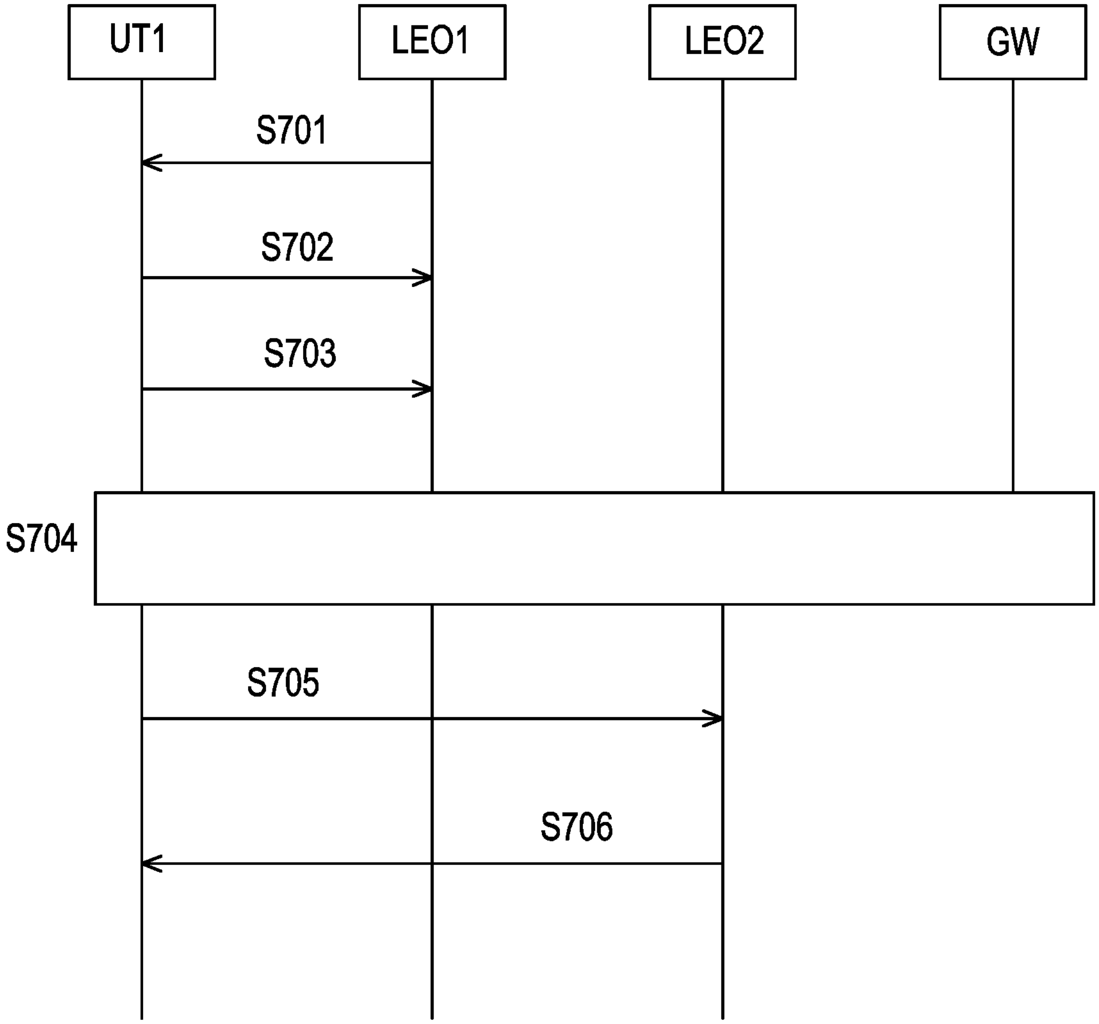
FIG. 7 is a signaling diagram of a user terminal installing routing information into a second satellite according to an embodiment of the disclosure.

FIG. 7 is a signaling diagram of a user terminal installing routing information into a second satellite according to an embodiment of the disclosure. In step S701, the user terminal UT1 receives a message broadcast from the satellite LEO1. In step S702, the user terminal UT1 logs into the satellite LEO1 and receives an ACK packet from the satellite LEO1. In step S703, the user terminal UT1 installs routing information into the routing table of the satellite LEO1. The content of the routing information is as in Table 1 above. In step S704, since the user terminal UT1 has set up the routing through the satellite LEO1, at this time, the user terminal UT1 may access a data network behind a gateway (GW) and connect to the Internet via a default route existing in the satellite LEO1 to the gateway GW. In step S705, when the contact time $t_{UT1}$ is reset to zero, the user terminal UT1 prepares for handover to the satellite LEO2. The user terminal UT1 evaluates the new contact time $t'_{UT1}$ of the satellite LEO2 and the next satellite following the satellite LEO2. The user terminal UT1 updates the routing information as in Table 2 above, and installs the updated routing information into the routing table of the satellite LEO2. In step S706, the user terminal UT1 receives an ACK packet from the satellite LEO2.

Figure 8:
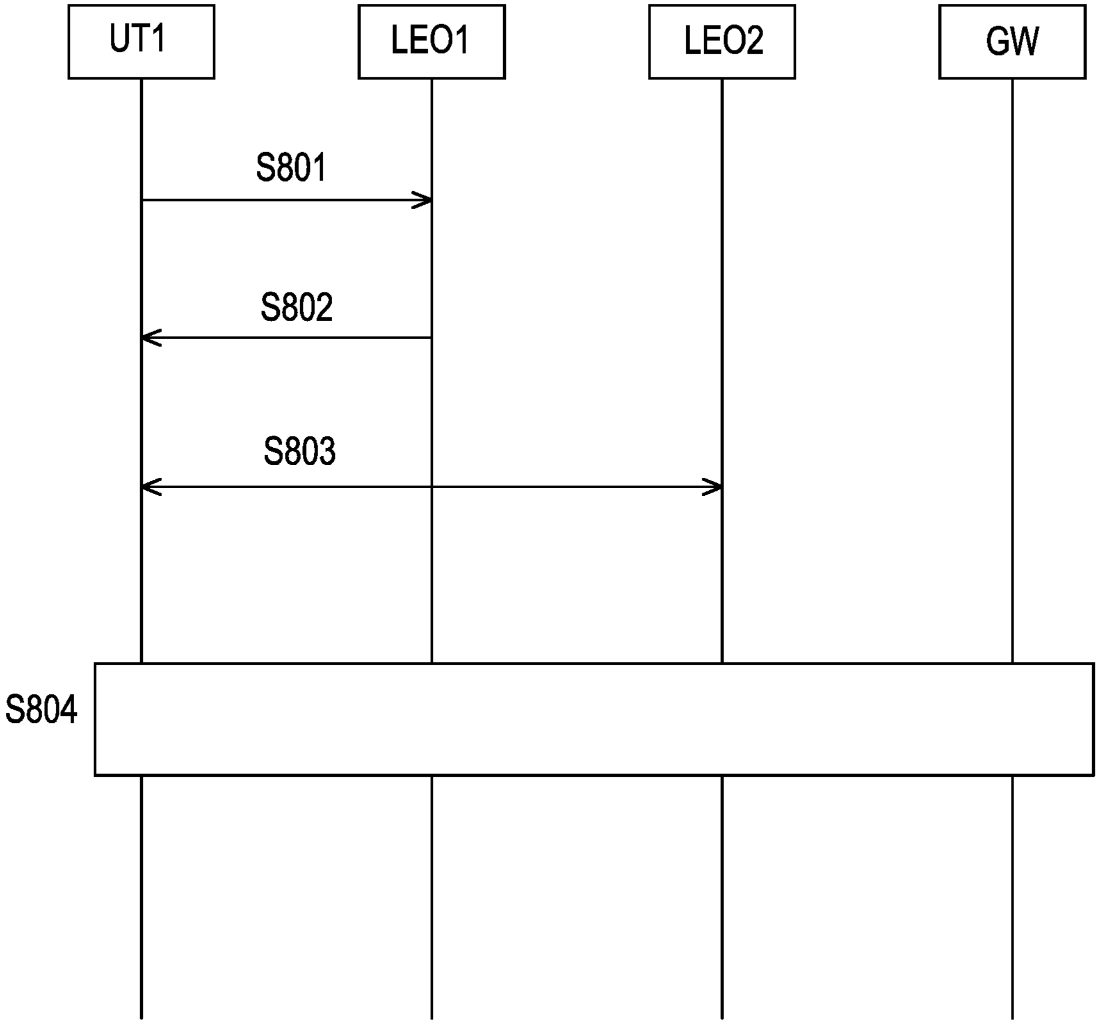
FIG. 8 is a signaling diagram for updating routing information of a first satellite to relay information by a user terminal according to an embodiment of the disclosure.

FIG. 8 is a signaling diagram for updating routing information of a first satellite to relay information by a user terminal according to an embodiment of the disclosure. In step S801, the user terminal UT1 updates the routing information of the routing table of the satellite LEO1 to the relay information that corresponds to the satellite LEO2 as in Table 3 above. In step S802, the user terminal UT1 receives an ACK packet from the satellite LEO1. In step S803, the user terminal UT1 performs handover from the satellite LEO1 to the satellite LEO2. Specifically, the user terminal UT1 logs into the satellite LEO2 and receives an ACK packet from the satellite LEO2. In step S804, since the user terminal UT1 has set up the routing through the satellite LEO2, at this time, the user terminal UT1 may access a data network behind a gateway GW and connect to the Internet via a default route existing in the satellite LEO2 to the gateway GW.

In summary of the foregoing, embodiments of the disclosure may provide a user terminal-based distributed control plane architecture. The user terminal may push the routing information of the user terminal to the satellite currently in service, or to the satellite to which handover is to be performed, and initiate handover by the user terminal when the contact time runs out. Accordingly, in the case of frequent handover by the user terminal between several satellites, the service continuity of the user terminal can be maintained, accordingly improving the user experience.

What is claimed is:

1. A method for switching routing in a low-earth-orbit satellite network, being adapted to a user terminal, the method comprising:

generating, by the user terminal, routing information and installing the routing information into a first routing table of a first satellite under control of the user terminal, wherein the routing information comprises a first contact time determined according to a flight trajectory model of the first satellite and a position of the user terminal;

in response to the first contact time being reset to zero, determining, by the user terminal, a second contact time according to a flight trajectory model of a second satellite and the position of the user terminal, and installing updated routing information according to the second contact time into a second routing table of the second satellite;

updating, by the user terminal, the routing information of the first routing table to relay information corresponding to the second satellite, wherein the relay information comprises a waiting time for retaining the relay information in the first routing table during handover and indicates transmission from an inter-satellite link to the second satellite; and after the updated routing information is installed into the second routing table and the routing information of the first routing table is updated to the relay information, performing, by the user terminal, handover from the first satellite to the second satellite.

2. The method of claim 1, wherein the routing information comprises an identification of the user terminal.

3. The method of claim 1, wherein the routing information comprises a position of the user terminal.

4. The method of claim 1, further comprising:

re-counting the waiting time in response to routing corresponding to the relay information being triggered during the waiting time.

5. The method of claim 1, further comprising:

removing the relay information from the first routing table in response to routing corresponding to the relay information not being triggered during the waiting time.

6. A user terminal, comprising:

a transceiver;

a storage medium; and a processor coupled to the transceiver and the storage medium, the processor being configured to:

generate routing information within the user terminal, and install the routing information into a first routing table of a first satellite, wherein the routing information comprises a first contact time determined according to a flight trajectory model of the first satellite and a position of the user terminal;

in response to the first contact time being reset to zero, determine a second contact time according to a flight trajectory model of a second satellite and the position of the user terminal, and install updated routing information according to the second contact time into a second routing table of the second satellite;

update the routing information of the first routing table to relay information corresponding to the second satellite, wherein the relay information comprises a waiting time for retaining the relay information in the first routing table during handover and indicates transmission from an inter-satellite link to the second satellite; and after the updated routing information is installed into the second routing table and the routing information of the first routing table is updated to the relay information, perform handover from the first satellite to the second satellite.

7. The user terminal of claim 6, wherein the routing information comprises an identification of the user terminal.

8. The user terminal of claim 6, wherein the routing information comprises a position of the user terminal.

9. The user terminal of claim 6, wherein the processor is further configured to:

re-count the waiting time in response to routing corresponding to the relay information being triggered during the waiting time.

10. The user terminal of claim 6, wherein the processor is further configured to:

remove the relay information from the first routing table in response to routing corresponding to the relay information not being triggered during the waiting time.

* * * * *